United States Patent
Enomoto et al.

(10) Patent No.: US 9,808,039 B2
(45) Date of Patent: Nov. 7, 2017

(54) GLOVE AND PRODUCTION PROCESS THEREOF

(71) Applicants: MIDORI ANZEN CO., LTD., Tokyo (JP); HARTALEGA SDN BHD, Kuala Lumpur (MY)

(72) Inventors: Norihide Enomoto, Tokyo (JP); Taichi Ogawa, Tokyo (JP); Daisuke Hirama, Tokyo (JP); Kam Hon Kuan, Kuala Lumpur (MY); Mun Leong Kuan, Kuala Lumpur (MY); Eu Jin Kuan, Kuala Lumpur (MY); Mei Ling Cheah, Kuala Lumpur (MY); Bin Mat Satar Mohd Zaidi, Kuala Lumpur (MY)

(73) Assignees: Midori Anzen Co. Ltd., Tokyo (JP); Hartalega SDN BHD, Kuala Lumpur (MY)

( * ) Notice: Subject to any disclaimer, the term of this patent is extended or adjusted under 35 U.S.C. 154(b) by 0 days.

(21) Appl. No.: 14/898,412

(22) PCT Filed: Jun. 12, 2014

(86) PCT No.: PCT/JP2014/065540
§ 371 (c)(1),
(2) Date: Dec. 14, 2015

(87) PCT Pub. No.: WO2014/200047
PCT Pub. Date: Dec. 18, 2014

(65) Prior Publication Data
US 2016/0150840 A1    Jun. 2, 2016

(30) Foreign Application Priority Data
Jun. 14, 2013    (JP) .................................. 2013-126073

(51) Int. Cl.
*A41D 19/00* (2006.01)
*C08L 21/00* (2006.01)
*C08L 13/00* (2006.01)

(52) U.S. Cl.
CPC ..... *A41D 19/0082* (2013.01); *A41D 19/0062* (2013.01); *C08L 13/00* (2013.01); *C08L 21/00* (2013.01)

(58) Field of Classification Search
CPC . A41D 19/0082; A41D 19/0062; C08L 21/00; C08L 13/00
USPC .................................. 523/334; 524/431, 440
See application file for complete search history.

(56) References Cited

FOREIGN PATENT DOCUMENTS

| | | |
|---|---|---|
| JP | 2005-519294 | 6/2005 |
| JP | 2008-189788 | 8/2008 |
| JP | 3149893 | 4/2009 |
| JP | 2009-120974 | 6/2009 |
| JP | 2013-101080 | 5/2013 |
| WO | WO 2010/089904 | 8/2010 |

OTHER PUBLICATIONS

JP 2009-120974 machine translation of original dated 2009.*
JP 2008-189788 machine translation of original dated 2008.*
JP 2005-519294 machine translation of original dated 2005.*
JP 2013-101080 machine translation of original dated 2013.*
International Search Report and Written Opinion of PCT/JP2014/065540, dated Aug. 5, 2014 and English-language translation.

* cited by examiner

*Primary Examiner* — Edward Cain
(74) *Attorney, Agent, or Firm* — Greenberg Traurig, LLP

(57) ABSTRACT

The present invention reduces the minimum detectable volume of a piece of a glove in the detection using a metal detector. A glove made of a rubber or resin film which contains magnetic particles, wherein the quantity of the magnetic particles is 0.2 to less than 40 mass % relative to the whole of the film; and the magnetic particles comprise secondary particles formed by the agglomeration of primary particles.

9 Claims, 3 Drawing Sheets

[Fig.1]
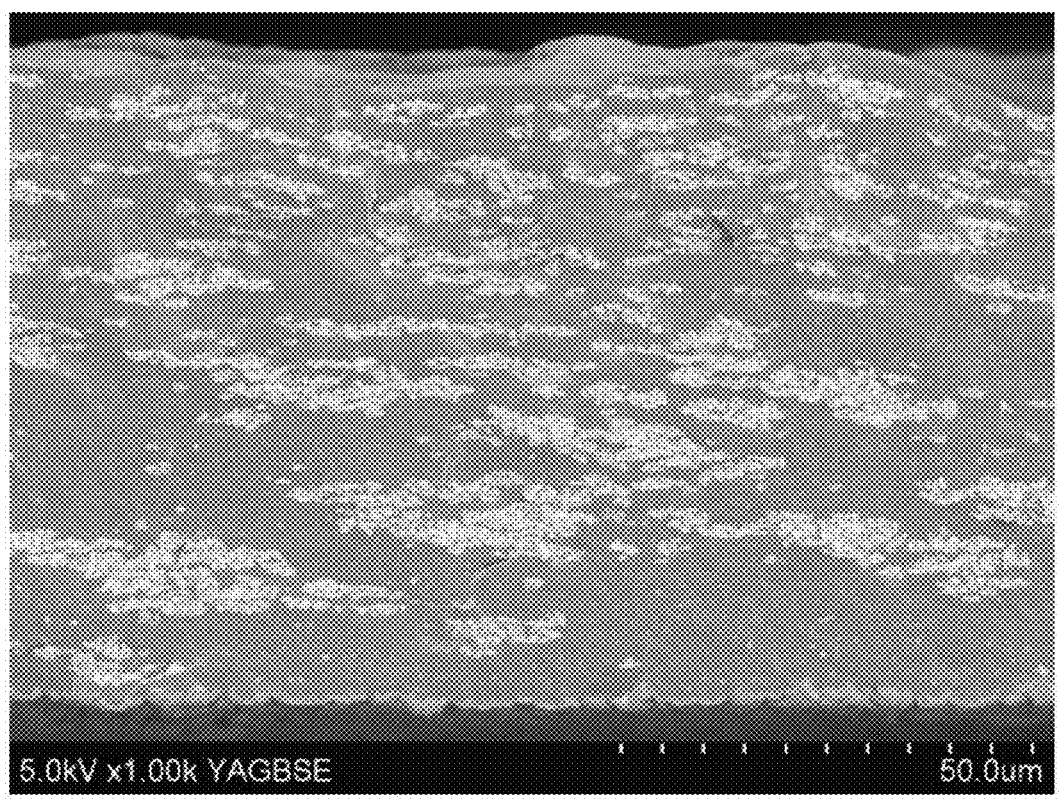
Example 5

[Fig.2]
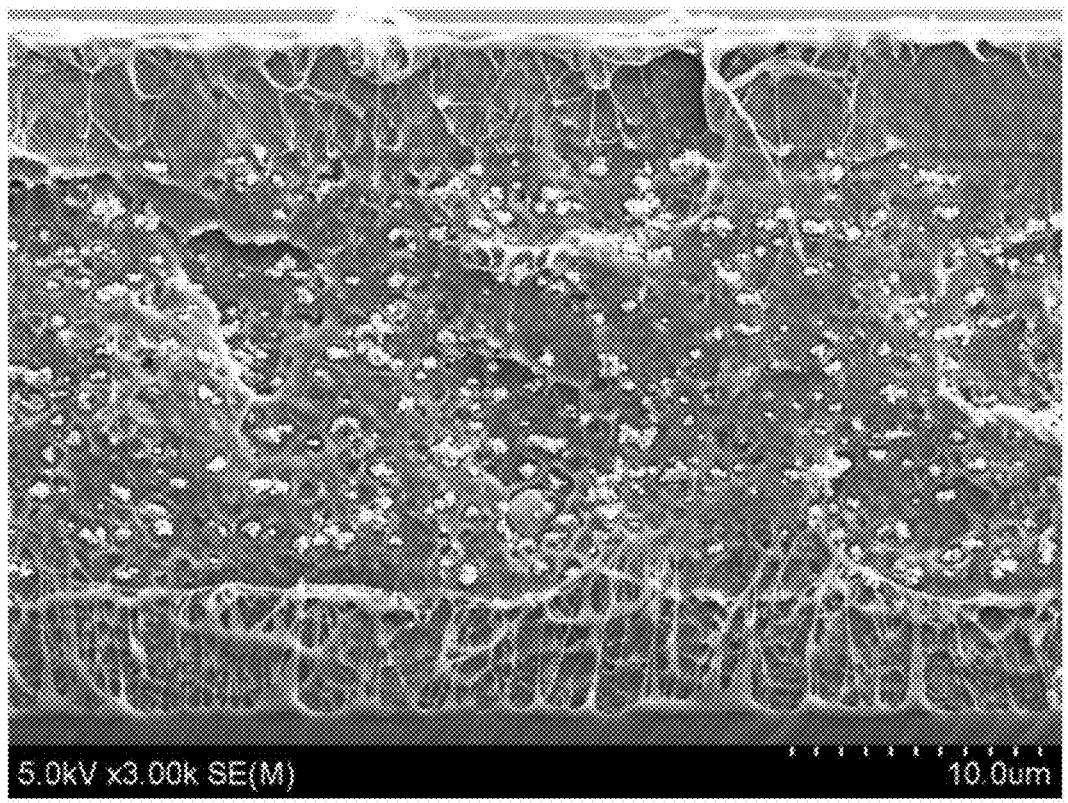
Comparative Example 3

[Fig.3]
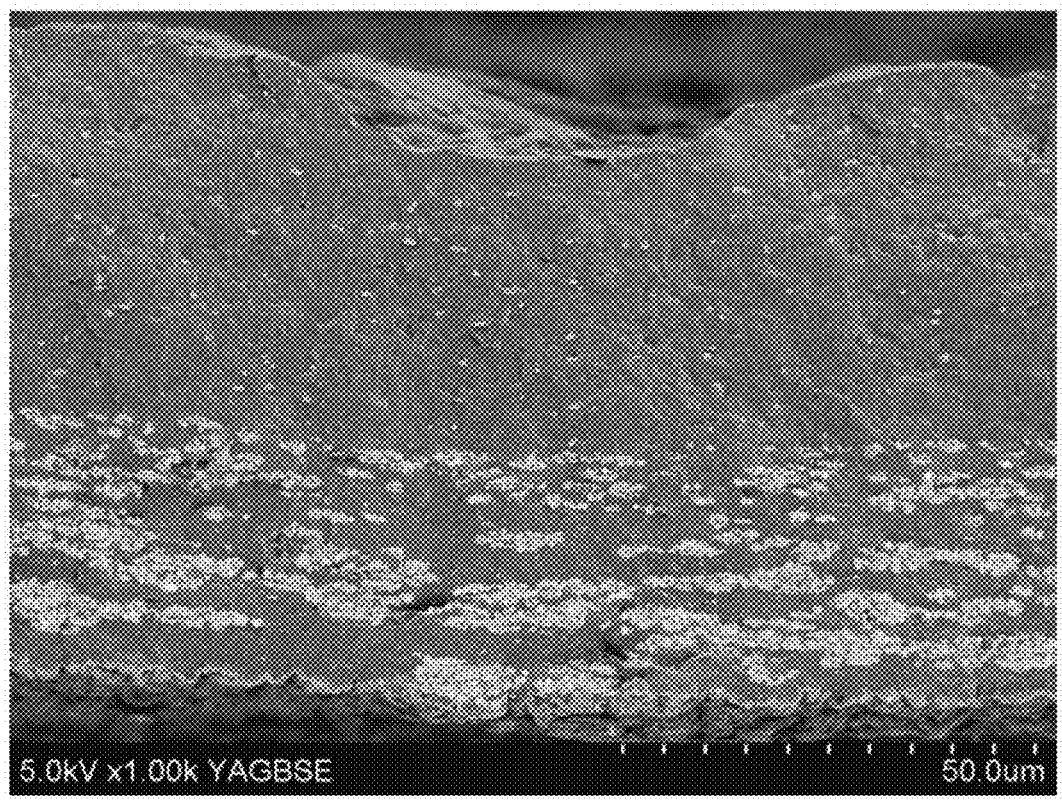
Example 9

GLOVE AND PRODUCTION PROCESS THEREOF

TECHNICAL FIELD

The present invention relates to a glove, and more particularly to a glove which is detectable with a metal detector and to a method for the manufacture thereof.

TECHNICAL BACKGROUND

Gloves made of rubber or resin are widely employed in various industries such as the food industry, the electronic components manufacturing industry and the pharmaceutical industry, as well as in medical applications and the like. In applications of this kind, if the gloves are damaged such that small pieces of glove are formed, and then these pieces are mixed into the product or into the package, problems arise. In particular, in the food industry, in order to manufacture a food product safely by mass production, the detection of any such contaminating pieces of glove is important.

As a method for detecting pieces of glove mixed into a product, etc., there is the method in which a magnetic material is incorporated into the glove beforehand and any pieces of glove containing the magnetic material are then detected by subjecting the product to measurement by means of a metal detector. For example, it is possible to detect pieces of glove contaminating a product by performing measurement of the product by means of a belt conveyor type metal detector in the final stage of the production line.

In Patent Document 1, gloves are proposed comprising a glove body of thickness 0.01-3 mm formed from rubber, a synthetic resin or a synthetic resin film, and where black iron oxide powder is mixed into the glove body.

According to Patent Document 1, at least 20 mass % of black iron oxide powder of no more than 0.1-1 μm is incorporated into the rubber, etc.

In Patent Document 2, there is proposed a latex article which is a magnetically detectable latex article containing chromium oxide dispersed in a cured latex layer or in the cured latex layers as a whole.

PRIOR TECHNICAL DOCUMENT

Patent Document

[Patent Document 1] Utility Model Registration No 3149893
[Patent Document 2] JP-A-2005-519294

In Patent Document 1, the amount of black iron oxide powder incorporated is high, so detection of broken pieces of glove is possible by means of a metal detector or the like. However, the mechanical properties of the glove and its feel during use may be impaired by the excessive incorporation of the black iron oxide powder. Furthermore, only black iron oxide powder of no more than 0.1-1 μm is added.

In Patent Document 2, the particle size of the chromium oxide starting material in the examples is given as 0.30 μm-15.00 μm, but the form of the individual particles within the glove is not investigated. Moreover, in Patent Document 2, only a dispersion is prepared by just adding and stirring chromium oxide into the latex (paragraph 0018).

In neither Patent Documents 1 nor 2 is there any investigation of the dispersed state of the black iron oxide powder or chromium oxide within the glove, so it cannot be said that the minimum volume of glove piece detectable by means of a metal detector is sufficiently small, and it can be said that there is no optimization of the glove detection performance by means of a metal detector.

SUMMARY OF THE INVENTION

Means for Solving the Problem

Hence, one of the objectives of the present invention lies in reducing the minimum volume of glove piece detectable by means of a metal detector.

One aspect of the present invention is a glove having a single layer or a multi-layer film formed from rubber or resin which contains magnetic particles in all or in part of this film, where said glove contains at least 0.2 mass % but less than 40 mass % of these particles in the glove film as a whole, and where the magnetic particles include secondary particles of aggregated primary particles.

Another aspect of the present invention is a method for manufacturing a glove which includes a process wherein magnetic particles in which the average particle diameter of the primary particles is no more than 1 μm are dispersed in a solvent to prepare a magnetic particle dispersion, a process wherein said magnetic particle dispersion is added to an emulsion containing rubber or resin to prepare an emulsion containing magnetic particles in which the magnetic particles are at least 0.2 mass % of the total solids component content, and a process wherein there is produced a glove having a single layer using the emulsion containing magnetic particles or having a plurality of rubber or resin layers using different compositions of the emulsion containing magnetic particles, and where the magnetic particles are at least 0.2 mass % but less than 40 mass % of the glove film as a whole and include secondary particles of aggregated primary particles.

Effect of the Invention

By means of the present invention, it is possible to lower the minimum volume of glove pieces detectable by means of a metal detector.

BRIEF EXPLANATION OF THE DRAWINGS

FIG. 1 is an electron micrograph of the glove cross-section in Example 5.
FIG. 2 is an electron micrograph of the glove cross-section in Comparative Example 3.
FIG. 3 is an electron micrograph of the glove cross-section in Example 9.

PREFERRED EMBODIMENT OF THE INVENTION

[Glove]

As a glove based on one embodiment of the present invention, there is the glove having a single layer or a multi-layer film formed from rubber or resin, and containing magnetic particles in all or in a part of this film, characterized in that there are at least 0.2 mass % but less than 40 mass % of the magnetic particles in terms of the glove as a whole, and the magnetic particles include secondary particles of aggregated primary particles.

In this way, even with a small amount of the magnetic particles, the magnetic characteristics, etc., of the magnetic particles (saturation magnetic flux density or saturation magnetization) are enhanced, and it is possible to lower the minimum volume of glove pieces detectable by means of a metal detector. Moreover, it is possible to obtain excellent mechanical properties.

In this embodiment, even with a small amount of magnetic particles, it is possible to increase the glove piece detection sensitivity based on a metal detector. In particular, in the food industry, adulteration by impurities is a problem but, by means of this embodiment, the detection of smaller glove pieces is possible by means of a metal detector, so it is possible to prevent the contamination of foods and packages by glove pieces.

Hitherto, when the amount of magnetic particles has been increased to improve the magnetic characteristics of the glove, the mechanical properties and the feel during use have sometimes been adversely affected. By means of the present embodiment, it is possible to enhance the magnetic characteristics (saturation magnetic flux density, etc.) with just a small amount of magnetic particles, so it is possible to prevent a lowering in the mechanical properties and feel during use while still raising the detection sensitivity by means of a metal detector.

As the rubber for a glove based on this embodiment, it is possible to use both natural and synthetic rubbers, specific examples of which include natural rubber, nitrile butadiene rubber (NBR), carboxylated NBR (X-NBR), isoprene rubber, chloroprene rubber, butyl rubber, butadiene rubber, silicone rubber, fluoro-rubber, urethane rubber, styrene butadiene rubber (SBR), polychloroprene and the like. These can be employed on their own or in combinations of two or more types thereof.

The Mooney viscosity (ML1+4(100° C.)) of the unvulcanised rubber, which is a measure of its molecular weight, is preferably between 30 and 200. Below the lower limit of this Mooney viscosity range, there is a fear of migration to the glove surface (bleeding), whereas above the upper limit the flexibility of the glove may be insufficient.

As examples of the resin for a glove based on this embodiment, there are polyvinyl chloride resins, polyethylene resins, polyacrylic resins, polyurethane resins, polypropylene resins and the like. These can be employed on their own or in combinations of two or more types thereof.

The weight average molecular weight of the resin, based on styrene conversion, is preferably between 10,000 and 1,000,000, and more preferably between 15,000 and 800,000. If the molecular weight lies below the lower limit of this range, there is a fear of migration to the glove surface (bleeding), whereas above the upper limit the flexibility of the glove may be inadequate.

As magnetic particles based on this embodiment, it is preferred that the saturation magnetic moment per unit mass be 50 G·cm$^3$/g, 50 A/m·kg or more, or 6.28×10−5 Wb·m/kg or more.

It is possible to employ, for example, a ferrite, pure iron, chromium oxide or cobalt as the magnetic particles. As examples of the ferrite, there are nickel ferrite, manganese ferrite, maghemite, magnetite ($FeFe^{3+}_2O_4$), manganese-zinc ferrite ($Mn.ZnFe_2O_4$), nickel-zinc ferrite ($Ni.ZnFe_2O_4$) and the like. These can be employed on their own or in combinations of two or more types thereof.

In terms of stability, safety and ready availability, magnetite can preferably be used. When magnetite is employed, it is possible to produce a glove which satisfies the Japanese Food Sanitation Law and, in particular, it is possible to produce a glove which can be used without concern in the food industry.

The magnetic particles preferably include secondary particles of aggregated primary particles. Aggregation is a form wherein a plurality of primary particles is gathered together to form a single aggregate based on the plurality of primary particles. The form of the secondary particles of the aggregated primary particles can be identified by a scanning electron microscope (SEM), and it can be seen that pluralities of the individual particles, that is to say of the primary particles, collect together as discrete masses, i.e. as aggregates.

In the form wherein magnetic particles are aggregated in this way, it is possible to mitigate factors which interfere with the saturation magnetic flux density of the magnetic particles, and so the saturation magnetic flux density of the magnetic particles can be fully manifested. More particularly, it is possible to mitigate the effects of diamagnetic fields in electromagnetism, etc.

Furthermore, it is possible to manufacture a glove in which large magnetic particles are uniformly distributed. When producing a magnetic particle dispersion, if an attempt is made to suddenly disperse and mix large magnetic particles into a solvent, the magnetic particles settle out during the mixing and so are not uniformly dispersed in the solvent. In contrast, by using small magnetic particles, and bringing about aggregation of the primary magnetic particles in the mixing process so that secondary magnetic particles are formed, it is possible to obtain a magnetic particle dispersion in which large magnetic particles are uniformly dispersed. In other words, it is possible to achieve a more uniform distribution of magnetic particles within the glove film by having the magnetic particles present within the glove film in the form of secondary particles of aggregated primary particles.

With regard to the magnetic particles, it is desirable that the proportion by volume of particles where the particle diameter of the secondary particles exceeds 1 μm is at least 20 vol % in terms of the overall volume of particles as a whole.

Preferably, the proportion by volume of particles where the particle diameter of the secondary particles exceeds 1 μm is at least 30 vol % in terms of the overall volume of the particles as a whole, more preferably at least 35 vol %, and still more preferably at least 40 vol %.

When the proportion by volume of particles where the particle diameter of the secondary particles exceeds 1 μm is at least 20 vol % in terms of the overall volume of particles as a whole, the magnetic characteristics of the glove are enhanced and it is possible to raise the sensitivity of detection by means of a metal detector in comparison to the state where primary particles are dispersed on their own.

Furthermore, when the proportion by volume of particles where the particle diameter of the secondary magnetic particles exceeds 1 μm is at least 20 vol % in terms of the overall volume of particles as a whole, the magnetic particles are uniformly incorporated within the glove even where the amount of magnetic particles is low, and it is possible to enhance the magnetic characteristics of the glove and raise the detection sensitivity based on a metal detector.

On the other hand, while the upper limit of the proportion by volume of particles where the particle diameter of the secondary particles exceeds 1 μm is not particularly restricted and may be up to 100 mass %, taking into account the fact that particles of small diameter will be included based on particle size distribution, the preferable upper limit is normally no more than 90 vol %.

Here, the measurement of the diameter of the secondary magnetic particles can be conducted by the following method. First of all, the secondary particles in the cross-section of a cut glove are observed using a scanning electron microscope (SEM). A secondary particle is observed as a single particle grain, that is to say as an aggregate wherein two or more primary particles are seen to overlap. Next, the major and minor axes of the observed secondary particle are measured. Then, the diameter of a perfect sphere having the same volume as this secondary particle is calculated, and this diameter can be employed as the secondary particle diameter.

The measurement of the proportion by volume of particles where the secondary particle diameter exceeds 1 μm can be carried out by the following method. First of all, using a scanning electron microscope (SEM), the cut cross-section of glove is observed in such a way that from 200 to 700 secondary particles are included in the specified range, and then the diameters of these 200-700 secondary particles are determined by the method described above. Next, the proportion by volume of particles where the particle diameter of the secondary particles exceeds 1 μm can be determined as the proportion by volume of secondary particles exceeding 1 μm in terms of the combined volume of the 200-700 secondary particles.

It is preferred that the average particle diameter of the primary magnetic particles be no more than 1 μm. Unless otherwise specified, the average particle diameter is the number average particle diameter (so too below).

When the average particle diameter of the primary magnetic particles is no more than 1 μm, it is possible for the magnetic particles to be incorporated entirely uniformly into the glove. More particularly, in the glove manufacturing method, the magnetic particles can be uniformly dispersed in the starting material, and the magnetic particles can then be uniformly incorporated into the glove obtained.

The average particle diameter of the primary magnetic particles is more preferably no more than 0.8 μm, still more preferably no more than 0.6 μm, and even more preferably no more than 0.4 μm.

On the other hand, the lower the average particle diameter of the primary magnetic particles, the greater the specific surface area and there may be deactivation due to oxidation of the surface of said magnetic particles. From this point of view, it is preferred that the average particle diameter of the primary magnetic particles be at least 0.001 μm, more preferably at least 0.005 μm, and still more preferably at least 0.01 μm.

Here, the measurement of the primary particle diameter of the magnetic particles can be carried out by the same method as for the measurement of the diameter of the secondary particles described above, with the diameters of 200-700 primary particles being measured and then the numerical average thereof determined. In the scanning electron microscope (SEM) observations, the individual primary particles are observed as single particles.

The magnetic particle content is preferably at least 0.2 mass % in terms of the entire glove film, more preferably at least 0.3 mass % and still more preferably at least 0.5 mass %. In this way, the saturation magnetic flux density of the glove as a whole is enhanced and it is possible to detect smaller glove pieces with a metal detector.

On the other hand, the content of the magnetic particles in term of the glove film as a whole is less than 40 mass %, more preferably no more than 30 mass %, and still more preferably less than 20 mass %. In this way, it is possible to enhance the mechanical properties of the glove and its feel during use. In particular, it is possible to reduce any lowering in the strength and elongation at break of the glove.

It is preferred that at least 10 mass % of ferrite particles be included in terms of the magnetic particles as a whole, with at least 70 mass % being more preferred.

Magnetite is more preferred as the ferrite. In such circumstances, it is preferred that there be included at least 50 mass %, and more preferably at least 80 mass %, of magnetite in terms of the magnetic particles in the glove as a whole.

The magnetic particle content and compositional ratio can be determined from the ratio of the amount of magnetic particles in terms of the total non-volatiles fraction (solids component) of the mixed starting materials in the glove manufacturing process.

The magnetic particle content can be determined by measuring the residual amount of magnetic particles in the glove using a high frequency plasma emission spectroscopy (ICP-AES) device.

Moreover, the compositional ratio of the magnetic particles can be obtained by measuring the compositional ratio of the magnetic particles in the glove using X-ray diffraction analysis (XRD).

In the X-ray diffraction analysis, there may be employed a sample piece obtained by carbonizing the glove at 400° C. in a nitrogen atmosphere. Measurement of the sample piece can be carried out under the following conditions using a model "RINT2000" X-ray diffraction measurement device manufactured by Rigaku Corporation.

tube: Cu
voltage: 40 kV
current: 200 mA
measurement angle 2θ: 5 to 90° C.
step: 0.02°
scan speed: 4°/min
divergence, scattering slits: 1 deg
receiving slit: 0.3 mmsw The glove according to this embodiment may also include other optional components within a range such that the effects of the invention are not impaired. For example, there are the optional components added to the starting materials in the glove manufacturing method described below. The total amount of such blended optional components is normally no more than 25 mass % in terms of the glove as a whole.

The minimum volume of glove piece detectable by means of a metal detector is preferably 40 $mm^3$ or below, more preferably 38 $mm^3$ or below and still more preferably 36 $mm^3$ or below. In this way, it is possible to detect smaller glove pieces as impurities by means of the metal detector. In particular, smaller glove pieces can be detected in a food production line, so it is possible to prevent the food product, etc., from being contaminated with pieces of glove.

With the present embodiment it is possible, by means of a metal detector, to detect glove pieces having even smaller amounts of magnetic particles, so it is possible to further lower the detectable size of a glove piece.

On the other hand, while also depending on the detection limit of the metal detector, the lower limit in terms of the minimum volume of glove piece detectable by means of the metal detector can normally be made 0.50 $mm^3$ or above.

Here, the minimum volume of glove piece detectable by means of a metal detector can be measured by the following method.

Glove pieces are prepared by cutting a glove into pieces of various sizes, and measurements are then carried out to determine whether these various glove pieces can be detected by means of the metal detector. The lowest volume of glove piece which can be detected by means of the metal detector is taken as the minimum detectable volume.

As examples of the metal detector, there are "duw-h KD8112BW" manufactured by Anritsu Industrial Solutions Co., Ltd. and "MS-3137A-25HI-100" manufactured by Nissin Electronics Co., Ltd. The predetermined detection sensitivity for these is an iron ball of diameter 0.5 mm.

Thus, for example, in regard to the detectable size of glove piece equivalent to an iron ball of diameter 0.5 mm in the metal detector, with the present embodiment the glove piece can be a 3 mm square glove piece of thickness 0.08 mm, that is to say a glove piece of volume 0.7 $mm^3$, when there is 15 mass % of the magnetic particles in terms of the glove as a whole.

On the other hand, with a conventional glove, the detectable size of glove piece equivalent to an iron ball of diameter 0.5 mm in the metal detector is a 5.5 mm square glove piece of thickness 0.03 mm, that is to say a glove piece of volume 0.9 $mm^3$, when there is at least 20 mass % of magnetic particles in terms of the glove as a whole.

Hence, it is apparent that, with the present embodiment, detection by means of a metal detector is possible for smaller glove pieces having a lower magnetic particle content than the conventional case.

The saturation magnetic flux density of the glove is preferably at least 1 gauss, and more preferably 4 gauss or more. In this way, it is possible to detect smaller glove pieces by means of the metal detector. In the present embodiment, it is possible to raise the saturation magnetic flux density of the glove even with a smaller amount of the magnetic particles.

On the other hand, it is preferred that the saturation magnetic flux density of the glove be no more than 220 gauss, and more preferably no more than 200 gauss. This is because the mechanical properties of the glove may be lowered when an excessive amount of magnetic particles is incorporated in order to enhance the saturation magnetic flux density, so this can thereby be prevented.

The saturation magnetic flux density of the glove can be measured with a vibrating sample magnetometer (VSM). Specifically, measurement can be conducted at room temperature using a model "VSM-5-15" device manufactured by Toei Industry Co., Ltd. employing Ni (nickel) and $Gd_2O_3$ (gadolinium oxide) magnetization calibration, in a 10 kOe measurement field.

The tensile strength of the glove is preferably at least 20 MPa, more preferably at least 21 MPa, and still more preferably at least 22 MPa.

The tensile breaking elongation of the glove is preferably at least 400%, more preferably at least 410%, and still more preferably at least 415%.

The 100% modulus of the glove is preferably no more than 5.5 MPa, and more preferably no more than 5.2 MPa.

When the tensile strength, tensile breaking elongation and 100% modulus lie within the aforesaid respective ranges, it is possible to enhance the mechanical properties of the glove and its feel during use. With this embodiment, it is possible to suitably adjust the amount of magnetic particles in the glove, and it is possible to obtain mechanical properties and a feel during use equivalent to those of a glove in which no magnetic particles have been incorporated.

With regard to the methods for measuring the glove tensile strength, tensile breaking elongation and the 100% modulus, these can be measured in accordance with JIS K6251-1993. Specifically, measurements can be carried out with a No. 5 dumbbell, at an extension rate of 500 mm/min, using a model "STA-1225" tensile testing machine manufactured by Orientec Co., Ltd.

The thickness of the glove is preferably no more than 0.20 mm, more preferably no more than 0.15 mm, and still more preferably no more than 0.10 mm. By means of the present embodiment, detection is possible using a metal detector with a smaller amount of magnetic particles. Hence, detection sensitivity can be maintained even when the thickness of the glove is no more than 0.20 mm.

On the other hand, from the point of view of the mechanical properties of the glove, it is preferred that the thickness of the glove be at least 0.05 mm, and more preferably at least 0.07 mm.

[Glove Manufacturing Method]

A glove manufacturing method based on an embodiment of the present invention is characterized in that it includes a process wherein magnetic particles in which the average particle diameter of the Ornery particles is no more than 1 μm are dispersed in a solvent to produce a magnetic particle dispersion, a process wherein said magnetic particle dispersion is added to an emulsion containing rubber or resin to prepare an emulsion containing magnetic particles in which the magnetic particles are at least 0.2 mass % but less than 80 mass % in terms of the total solids component content, and a process wherein there is produced a glove having a single layer using the emulsion containing magnetic particles or having a plurality of rubber or resin layers using different compositions of the emulsion containing magnetic particles, and where the magnetic particles are at least 0.2 mass % but less than 40 mass % of the glove film as a whole and include secondary particles of aggregated primary particles.

In this way, the magnetic particles form secondary particles of suitable size within the glove, and even with a small magnetic particle content it is possible to provide a glove where the minimum volume of glove piece detectable by means of a metal detector is low. Additionally, it is possible to obtain outstanding mechanical properties.

In the glove manufacturing method based on this embodiment, first of all, magnetic particles where the average particle diameter of the primary particles is no more than 1 μm are dispersed in a solvent, and a magnetic particle dispersion is prepared.

The magnetic particles here are as described above. By dispersing, in a solvent, magnetic particles in which the average particle diameter of the primary particles is no more than 1 μm, the Ornery magnetic particles can be made to aggregate together to form aggregates within the dispersion. In regard to these aggregates, the proportion by volume of particles where the particle diameter exceeds 1 μm is preferably at least 20 vol % in terms of the volume of particles as a whole. It is thought that these aggregates are then incorporated into the glove while maintaining their form as secondary magnetic particles of particle diameter in the above range.

The average particle diameter of the primary particles in the starting material magnetic particles should be no more than 1 μm, more preferably no more than 0.8 μm, still more preferably no more than 0.6 μm, and even more preferably no more than 0.4 μm.

On the other hand, the average particle diameter of the primary particles in the starting material magnetic particles is preferably at least 0.01 μm, and more preferably at least 0.05 μm.

It is preferred that the primary particles in the starting material magnetic particles are not aggregated in the form of secondary particles.

It is preferred that the aggregates formed in the dispersion maintain their shape and size following glove manufacture. In such circumstances, it is preferred that the particle diameter of the aggregates formed in the dispersion roughly corresponds to the particle diameter of the secondary particles described above.

The solvent in the magnetic particle dispersion is preferably an aqueous solvent, and the dispersion is preferably a dispersion in water but may optionally also include a water-soluble organic solvent.

It is preferred that there be included at least 10 mass % of magnetic particles in the magnetic particle dispersion as a whole, with at least 12 mass % being further preferred.

On the other hand, it is preferred that no more than 90 mass % of magnetic particles be included in the magnetic particle dispersion as a whole, with no more than 85 mass % being further preferred.

Within this range, the dispersibility of the magnetic particles in the solvent can be enhanced, in addition to which it is possible to control the size of the aggregates in the dispersion and obtain secondary particles in the glove present in the proportion based on particle diameter range described above.

From the point of view of the dispersibility of the magnetic particles, it is possible to add a surfactant as a dispersing agent to the magnetic particle dispersion.

As examples of the surfactant, there are anionic surfactants such as carboxylic acid salts, sulphonic add salts, polyacrylic add salts, phosphoric add salts, polyphosphate esters, polymerized alkyl aryl sulphonates, high molecular weight sulphonated naphthalene, high molecular weight naphthalene/formaldehyde condensates, and the like;

nonionic surfactants such as polyethylene glycol alkyl ethers, polyethylene glycol alkyl esters, polyethylene glycol fatty add amides, and the like;

cationic surfactants such as alkyltrimethyl ammonium salts, benzalkonium salts and the like; and amphoteric surfactants such as N,N-dimethyl-N-alkyl-N-carboxy ammonium betaine, N,N-dialkylaminoalkylene carboxylic add salts and the like, and preferably anionic surfactants can be used.

Of the above, preferred examples of the surfactant include polyethylene glycol alkyl ethers, sulphonic add salts such as alkylbenzene sulphonic add salts and aliphatic sulphonic add salts, polyacrylic add salts and the like.

It is possible to include from 0.1 to 5.0 parts by mass, and more preferably from 0.2 to 4.0 parts by mass, of surfactant per 100 parts by mass of solids component contained in the magnetic particle dispersion as a whole.

Colourants and pigments may also be added to the magnetic particle dispersion. Moreover, colourants and pigments may also be incorporated into the emulsion containing rubber or resin discussed below.

As colourants, there can be used natural dyes such as commercial caramel colouring and gardenia blue, etc., or synthetic colourants such as Indigo Carmine (Blue 2), Rose Bengal (Red 105), and the like.

It is possible to incorporate from 1.0 to 20.0 mass %, and more preferably from 2.0 to 15.0 mass %, of colourant in terms of the magnetic particle dispersion as a whole.

Moreover, following the manufacture of the glove, it is preferred that there be contained from 0.1 to 1.0 mass %, and more preferably 0.2 to 0.8 mass %, of colourant in terms of the glove as a whole.

Examples of pigments include white pigments such as $TiO_2$ and zinc oxide, red pigments such as red lead and iron oxide, blue pigments such as ultramarine blue and phthalocyanine blue, and the like.

It is possible to incorporate from 10 to 90 mass %, and more preferably from 15 to 80 mass %, of pigment in terms of the magnetic particle dispersion as a whole.

Moreover, it is preferred that, following the manufacture of the glove, there be contained from 1.0 to 5.0 mass %, and more preferably from 1.5 to 4.5 mass %, of pigment in terms of the glove as a whole.

As a method for preparing the magnetic particle dispersion, the aforesaid individual components may be mixed together all in one go, or a little at a time, with optional stirring being carried out. In the preparation of the magnetic particle dispersion, it is preferred that the magnetic particles are fully dispersed within the dispersion.

The individual components can be added to the solvent in turn, or all at the same time.

Any of the various aqueous solution stirring methods normally used can be employed as the stirring method.

The stirring time can normally be set at between 0.3 and 2.0 hours, with from 0.5 to 1.5 hours being preferred.

Next, the magnetic particle dispersion is added to an emulsion containing rubber or resin, to prepare an emulsion containing magnetic particles.

The rubber or resin contained in the emulsion is as described above. The emulsion containing rubber or resin is preferably an aqueous emulsion, and a water-soluble organic solvent may also optionally be included.

There should be at least 0.2 mass % of the magnetic particles in terms of the total solids component content of the emulsion containing magnetic particles. Preferably, it will be at least 0.3 mass %, and more preferably at least 0.5 mass %. On the other hand, it is preferred that the amount be less than 80 mass %, and more preferably no more than 70 mass %.

In the case where there is used an emulsion containing rubber, that is to say a rubber latex, the magnetic particle dispersing agent is added to the rubber latex optionally along with various additives such as a vulcanizing agent, vulcanizing accelerator, vulcanizing accelerator adjuvant, dispersing agent and the like. This rubber latex containing magnetic particles can be made to adhere to glove formers, and then drying and heating are performed at each such glove former to bring about vulcanization of the rubber, so that gloves are provided.

The rubber latex has a rubber solids content preferably lying between 12 and 60 mass %, and more preferably between 40 and 50 mass %.

Sulphur can be used as the vulcanizing agent. It is preferred that there be employed from 0.5 and 4.5 parts by mass of vulcanizing agent per 100 parts by mass of rubber solids component in the rubber latex.

Examples of the vulcanizing accelerator include dithiocarbamates, thiuram and thiazole compounds.

Furthermore, a divalent metal oxide can be favourably employed as the vulcanizing accelerator adjuvant. Examples of the divalent metal oxide include zinc oxide, calcium oxide, magnesium oxide and the like.

It is preferred that there be from 0.2 to 2.5 parts by mass of vulcanizing accelerator per 100 parts by mass of rubber solids component in the rubber latex.

As an emulsifier or dispersing agent, it is possible to use those exemplified in the case of the magnetic particle dispersion above. The emulsifier or dispersing agent used in the rubber latex is preferably one which does not form aggregates, or the like, by reaction with the dispersing agent in the magnetic particle dispersion. More preferably there is used the same dispersing agent in the rubber latex and in the magnetic particle dispersion.

It is preferred that there be from 2 to 4 parts by mass of dispersing agent per 100 parts by mass of rubber solids component in the rubber latex.

In the case where an emulsion containing a resin, that is to say a resin emulsion, is employed, the magnetic particle dispersing agent is added to the resin emulsion along with various optional additives such as a dispersing agent, etc. This resin emulsion containing magnetic particles can be made to adhere to glove formers, and then drying and heating are performed at each such glove former to bring about solidification of the resin, so that gloves are provided.

The resin emulsion preferably has a resin solids component content of from 12 to 60 mass %, and more preferably from 40 to 50 mass %.

Examples of the dispersing agent added to the resin emulsion are those used for the rubber latex described above.

Other optional components may also be included in the rubber latex or resin emulsion. For example, there are ageing inhibitors such as phenols or amines, and fillers such as kaolin, calcium carbonate and the like. These other optional components can normally be included in an amount not exceeding 10 mass % in terms of the rubber latex and/or resin emulsion as a whole.

The aforedescribed optional components may also be added following the addition of the magnetic particle dispersion to the rubber latex and/or resin emulsion. Moreover, at this stage, there may also be added a release agent such as paraffin wax or a vegetable wax, etc. These release agents also function as an ageing inhibitor. Normally, up to 5 mass % of such a release agent may be incorporated in terms of the magnetic particle-containing emulsion as a whole.

After adding the magnetic particle dispersion, it is preferred that the pH of the rubber latex or resin emulsion be alkaline, at pH 8 or above, and more preferably between pH 9 and 11. Potassium hydroxide or ammonia may be added as a pH regulator.

After adding the magnetic particle dispersion to the rubber latex or to the resin emulsion, the solids component content of the magnetic particle-containing emulsion can normally be made to lie between 10 and 85 mass %, and more preferably it is between 12 and 80 mass %.

Next, a glove is produced using this emulsion containing magnetic particles. The glove is preferably produced by an immersion method (dipping method). As the dipping method, there can be employed a direct dipping method, a coagulant dipping method, or a thermosensitive dipping method, etc.

In the direct dipping method, a glove former made of wood, metal or ceramic in the shape of a hand is dipped into the emulsion, so that this adheres to the surface of the glove former, and then by drying and vulcanizing it is possible to produce the glove.

As a coagulant dipping method, the anode process, the Teague process, or a repetition process can be employed, using a coagulating agent. Examples of the coagulating agent which can be used include calcium nitrate, calcium chloride, magnesium chloride and the like.

In the anode process, the glove former is dipped in the coagulating agent so that the coagulating agent adheres to the surface of said glove former, after which the glove former is dipped in the emulsion so that this adheres to the glove former surface, and then by drying and vulcanizing it is possible to produce a glove.

In the Teague process, the glove former is dipped in the emulsion so that this adheres to the surface of said glove former, after which the glove former is dipped in the coagulating agent so that gelling of the emulsion at the surface of the glove former takes place, and then by drying and vulcanizing it is possible to produce the glove.

In the repetition process, the glove former is alternately dipped in coagulating agent and emulsion, following which the glove can be produced by drying and vulcanizing. This method is suitable for the production of thick gloves, or for the production of gloves using an emulsion where the gelling is slow.

In the thermosensitive dipping method, a thermosensitive coagulating agent is added to the aforesaid emulsion, and then a heated glove former is dipped in the emulsion so that this adheres to the surface of the glove former and gels, after which the glove can be produced by drying and vulcanizing.

Below, as an example of a method for the production of a glove based on this embodiment, specific explanation is provided of a method wherein the glove is produced using a rubber latex containing magnetic particles, employing the anode coagulant dipping method.

(a) First of all, the glove former is washed with a cleaning liquid to remove any dirt, and then dried. As the cleaning liquid there can be used, for example, an aqueous acidic solution of nitric add or the like, an aqueous alkali solution of sodium hydroxide, sodium hypochlorite or the like, or hot water, etc.

(b) Next, the glove former is dipped in the coagulating agent solution. As a result, coagulating agent adheres to the surface of the glove former. As the coagulating agent solution, there can be used an aqueous solution containing from 5 to 50 mass %, and more preferably from 10 to 25 mass %, of the aforesaid coagulating agent. It is preferred that the coagulating agent solution be heated. More preferably, the temperature of the coagulating agent solution is between 30 and 70° C., and still more preferably between 55 and 65° C.

(c) After this, the glove former is withdrawn from the coagulating agent solution, and the glove former together with the adhering coagulating agent is then dried. The drying temperature normally lies between room temperature and 80° C., with a temperature of between 55 and 65° C. being further preferred. The glove former may be entirely dried, or it may be just partially dried.

(d) Then the glove former to which coagulating agent has been adhered and dried is dipped into the rubber latex containing magnetic particles in accordance with this embodiment. In this way, magnetic particles are made to adhere to the surface of the glove former along with the rubber. It is preferred that the rubber latex containing the magnetic particles be kept uniform by thorough stirring. Furthermore, the rubber latex containing the magnetic particles may be warmed. The warming temperature is preferably between 20 and 50° C., and more preferably between 25 and 40° C. The dipping of the glove former in the rubber latex containing magnetic particles may be performed once, or it may be carried out two or more times.

(e) After the dipping in the rubber latex containing magnetic particles, the glove former is dried. The drying can be carried out by holding the glove former inside a drying oven. The drying temperature is preferably from 80 to 150° C.

(f) Next, chemicals are removed (leached) from the glove former following the treatment in (e) above. An example of the removal method is the method wherein the glove former to which rubber latex containing magnetic particles adheres is treated in a leaching tank containing water. The water is preferably heated. The heating temperature is preferably between 30 and 80° C., and more preferably between 40 and 60° C.

(g) The rubber latex containing magnetic particles which has been affixed to the glove former is then vulcanized. The vulcanizing can be carried out by heating the glove former. A heating temperature of between 100° C. and 150° C. is preferred. The heating time can normally be from 1 minute to 1 hour, with from 15 to 30 minutes being preferred.

(h) Following the vulcanizing, the rubber glove can be removed from the glove former and the glove is obtained. Optionally, prior to removing the glove from the glove former, the surface of the glove can be treated with chlorine, then subjected to a neutralization treatment in alkali, and washed with water, after which it is dried. The chlorine treatment is preferably carried out at a chlorine concentration of between 800 and 2000 ppm.

In aforesaid dipping process (d), there can be included a stage in which the glove former is dipped in turn in a plurality of emulsions of different compositions, so that a plurality of layers of different compositions adheres to the glove former, and one or more of this plurality of emulsions can be the aforesaid emulsion containing magnetic particles.

In this way, it is possible to form a glove film based on a plurality of layers of different compositions, such that the functionality can be enhanced.

For example, there can be prepared a plurality of emulsions containing magnetic particles where said emulsions contain different proportions of magnetic particles, and the glove former is then dipped in turn into these respective emulsions containing magnetic particles.

Again, emulsions containing magnetic particles and not containing magnetic particles can be prepared, and then the glove former is dipped into these emulsions in turn.

In any of these cases, the glove former may be dipped once into each emulsion, or the glove former may also be dipped a number of times into the same emulsion. Moreover, there are no restrictions on the dipping order.

By initially applying to the glove former an emulsion which does not contain magnetic particles, or an emulsion containing a low concentration of magnetic particles, after which there is then applied an emulsion containing magnetic particles, or an emulsion containing a high concentration of magnetic particles, following the glove production there is formed at the glove surface a layer which does not contain magnetic particles, or a layer containing a low concentration of magnetic particles, so that adjustment of the colouring of the glove surface is possible.

In such circumstances, adjustment of the colouring of the outer surface becomes possible by including pigment in the initial emulsion, and then either not including, or reducing the concentration of, pigment in the next emulsion.

The glove according to this embodiment may be a glove with a single layer structure based on a film formed from rubber or resin, or it may also be a glove which is reinforced with fibre or the like. For example, it may be a glove which is an integral combination of a knitted glove made of fibre and a film formed from rubber or resin.

The glove based on the present embodiment encompasses, for example, gloves of the type which cover the entire palm, gloves of the type which cover the region from the fingers to the arm or elbow, and gloves of the type which cover only the finger tips, such as finger covers or the like.

EXAMPLES

Below, the present invention is explained by means of examples, but the invention is not to be restricted to these. Components employed in common in the examples below were identical such components.

Example 1

The starting material composition and evaluation results for the glove in this example are shown in Table 1.

[Preparation of the Magnetic Particle Dispersion]

From the starting materials shown in Table 1, the $TiO_2$, the pigment and, as the magnetic particles, particles of magnetite ($FeFe_2O_4$) were added to water in the compositional proportions given for the magnetic particle dispersion, and then SDBS (Na dodecylbenzene sulphonate) was also added. The mixture was uniformly stirred and mixed for one hour in the water, to prepare the magnetic particle dispersion. Adjustment of the water content was carried out at this time such that the solids component content of the magnetic particle dispersion was 50 mass %.

The components used were as follows.

$TiO_2$: $TiO_2$ white pigment powder, produced by Revertex Sdn Bhd pigment: a mixture of CI Pigment Blue 15:3 (copper phthalocyanine) and CI Pigment Violet 23 (8,18-dichloro-5,15-diethyl-5,15-dihydrodiindolo[3,2-b:3',2'-m]triphenodioxazine)

magnetite particles: magnetite $FeFe_2O_4$ particles, "Magnetite-MA" produced by the Toda Kogyo Corporation SDBS: Na dodecylbenzene sulphonate, produced by KC Chemicals (M) Sdn Bhd

[Preparation of the NBR Latex]

From the starting materials shown in Table 1, the NBR latex (expressed in Table 1 by solids content), sulphur, SDBS (Na dodecylbenzene sulphonate), vulcanizing accelerator and ZnO were mixed together in accordance with the compositional proportions given for the latex, and the NBR latex was prepared. At the time of the mixing, pH adjustment was performed by the addition of purified water, aqueous ammonia and an aqueous potassium hydroxide solution. The solids component content of the NBR latex obtained was 30 mass %.

The components employed were as follows.

NBR latex: "Nantex 6720", solids component content 43.5 mass %, produced by the Nantex Industry Co., Ltd.

sulphur: produced by Tiarco Chemical (M) Sdn Bhd vulcanizing accelerator: ZMBT (zinc bis(mercaptobenzothiazole)), produced by Tiarco Chemical (M) Sdn Bhd ZnO: produced by Tiarco Chemical (M) Sdn Bhd

[Preparation of the Rubber Latex Containing Magnetic Particles]

The magnetic particle dispersion was slowly added dropwise to the NBR latex, and the pH was adjusted to 9-11 by the addition of potassium hydroxide or ammonia. Preparation was carried out such that the mixing proportions of the NBR latex and magnetic particle dispersion at this time were as given in Table 1. Next, paraffin wax (produced by Emulco Sdn Bhd) was added, and the rubber latex containing magnetic particles was obtained. The solids component content of the final rubber latex containing magnetic particles was 30 mass %.

[Manufacture of the NBR Glove]

An NBR glove was produced by the dipping method using the aforesaid latex containing magnetic particles. The detailed procedure was as follows.

(a) The glove former was washed in turn with nitric add, aqueous sodium hydroxide solution and hot water to remove any dirt, and then dried.

(b) Next, the glove former was immersed in an aqueous solution of coagulating agent containing 10-25 mass % calcium nitrate at 55° C.-65° C.

(c) The glove former with adhering coagulating agent was then dried at 55-65° C.

(d) Following this, the glove former was dipped in the aforesaid latex containing magnetic particles which had been thoroughly uniformly stirred and mixed. By dipping the glove former to which coagulating agent adhered into the latex containing magnetic particles for 15 seconds at a temperature of 30° C., latex containing magnetic particles was made to adhere thereto. The dipping was carried out once.

(e) Next, the glove former with adhering latex containing magnetic particles was dried in an oven at 80-150° C.

(f) After this, chemicals were removed (leached) from the glove former. The glove former coated with partially-dried latex was treated by means of hot water (40-60° C.) within a leaching tank.

(g) Next, the latex adhering to the glove former was vulcanized. The vulcanization was carried out by heating the glove former under conditions of 120-150° C. for 15-30 minutes.

(h) Thereafter, the glove former surface (the face which becomes the inside when the glove is used) was given a treatment with chlorine (800-2000 ppm), followed by a neutralization treatment with alkali, and then washed with water, after which drying was performed and the glove was removed from the glove former.

The thickness of the glove obtained was 0.089 mm. The results are given in Table 1.

The primary particle diameter and the secondary particle diameter of the magnetic particles in the glove obtained were measured. The results are shown in Table 1.

The measurement of the proportion by volume of particles where the particle diameter of the secondary particles exceeded 1 μm was carried out by the following method. First of all, using a scanning electron microscope (SEM), the cut cross-section of the glove was observed, such that from 200 to 700 secondary particles were included in the specified range, and then the diameters of these 200-700 secondary particles were measured. With regard to the measurement of the secondary particle diameters, the major and minor axes of each secondary particle were measured, then the diameter of a perfect sphere having the same volume as the secondary particle was calculated, and this diameter was employed as the secondary particle diameter. Here, a secondary particle was observed as a single particle grain, that is to say as an aggregate in which two or more primary particles were seen to overlap. Next, the proportion by volume of particles where the particle diameter of the secondary particles exceeded 1 μm was determined as the proportion by volume of said secondary particles exceeding 1 μm in terms of the combined volume of the 200-700 secondary particles.

In Comparative Example 3, no secondary particles exceeding 1 μm were observed.

With regard to the average particle diameter of the primary particles, the diameters of 200-700 Ornery particles were measured by the same method as used for the measurement of the secondary particle diameter above, and then the numerical average of these was determined. In the scanning electron microscope (SEM) observations, a primary particle was taken as that observed to be a single particle.

The primary particle diameter of the starting material magnetite particles was equal to the primary particle diameter observed within the glove.

Examples 2-5

In Examples 2-5, gloves were produced in the same way as in Example 1 above except that the compositional proportions of the magnetic particle dispersions were changed as shown in Table 1.

Comparative Examples 1-3

The starting material compositions and the evaluation results of the gloves in these comparative examples are shown in Table 2.

In Comparative Examples 1 and 2, gloves were produced in the same way as in Example 1 above except that the compositional proportions of the magnetic particle dispersions were changed as shown in Table 2.

In Comparative Example 3, as a commercial product, there was employed an "MPF Sakuramen (commercial name)" glove produced by ARAM Corporation. This glove was made of polyethylene resin containing 18-22 mass % magnetite ($FeFe_2O_4$). In Table 2, for reference, an average value of 20 mass % is shown as the amount of the blended magnetite, i.e. the magnetic particles.

Examples 6-8

The starting material compositions and evaluation results for the gloves in these examples are shown in Table 3.

In Examples 6-8, gloves were produced in the same way as in Example 1 above except that, in each case, 4.8 mass % of the following were incorporated as the magnetic particles.

Example 6: $\gamma$-$Fe_2O_3$ ferrite powder, produced by Kanto Chemical Co., Inc.

Example 7: manganese-zinc ferrite ($Mn.ZnFe_2O_4$) powder, produced by JFE Chemical Corporation Example 8: nickel-zinc ferrite ($Ni.ZnFe_2O_4$) powder, produced by JFE Chemical Corporation Examples 9-13

The starting material compositions and evaluation results for the gloves in these examples are shown in Tables 4-6.

In Examples 9-13, gloves were produced in the same way as in Example 1 above except that, at the time of the dipping of the glove former in the rubber latex, the glove former was dipped once in each of a number of latex tanks of different compositions.

In Examples 9-11, the first latex tank held latex containing pigment but not containing magnetic particles, while the second latex tank held latex containing from 19.5 to 70.0 mass % of magnetic particles but containing no pigment.

In Examples 12 and 13, the first and the final rubber latex tanks held rubber latexes containing pigment but not containing magnetic particles, while the second and subsequent rubber latex tanks other than the final tank held rubber latexes containing from 38.0 to 70.0 mass % of magnetic particles but containing no pigment.

The glove former was dipped once into each of these rubber latex tanks.

In this way, there was produced a glove with a layered structure such that, when the glove was removed from the glove former, a layer was formed on the outside surface of the glove which contained pigment but did not contain magnetic particles, whereas within the glove there were formed layers which contained magnetic particles but did not contain pigment.

TABLE 1

Starting Material Composition and Evaluation Results for the Gloves in the Examples

| Units: mass % (converted to solids component) | | Example 1 | Example 2 | Example 3 | Example 4 | Example 5 |
|---|---|---|---|---|---|---|
| Type of magnetic particles | | $FeFe_2O_4$ | $FeFe_2O_4$ | $FeFe_2O_4$ | $FeFe_2O_4$ | $FeFe_2O_4$ |
| Latex | NBR latex | 90.8 | 90.1 | 86.5 | 81.3 | 77.3 |
| | Sulphur | 1.3 | 1.3 | 1.3 | 1.3 | 1.3 |
| | SDBS | 0.1 | 0.1 | 0.1 | 0.1 | 0.1 |
| | Vulcanizing accelerator | 0.4 | 0.4 | 0.4 | 0.4 | 0.4 |
| | ZnO | 1.2 | 1.2 | 1.2 | 1.2 | 1.2 |
| Magnetic Particle Dispersion | $TiO_2$ | 3.1 | 3.1 | 3.1 | 3.1 | 3.1 |
| | Pigment | 0.4 | 0.4 | 0.4 | 0.4 | 0.4 |
| | Magnetic particles | 0.5 | 1.2 | 4.8 | 10.0 | 15.0 |
| | SDBS | 0.4 | 0.4 | 0.4 | 0.4 | 0.4 |
| | Paraffin wax | 1.8 | 1.8 | 1.8 | 1.8 | 1.8 |
| Total (mass %) | | 100.0 | 100.0 | 100.0 | 100.0 | 100.0 |
| Thickness of glove film (mm) | | 0.089 | 0.088 | 0.089 | 0.091 | 0.087 |
| Average particle diameter (μm) of primary particles in glove | | 0.23 | 0.22 | 0.24 | 0.27 | 0.25 |
| Proportion (volume %) of secondary particles of particle diameter over 1 μm in glove | | 40 | 45 | 50 | 60 | 80 |
| Evaluation | Minimum detectable volume (mm³) by means of a metal detector | 36 | 13 | 2.3 | 1.0 | 0.7 |
| | Saturation magnetic flux density (Gauss) | 4 | 12 | 49 | 103 | 200 |
| | Tensile strength (MPa) | 23 | 25 | 28 | 30 | 32 |
| | Elongation (%) | 490 | 470 | 440 | 425 | 418 |
| | 100% modulus (MPa) | 4.1 | 4.3 | 4.9 | 5.1 | 52 |

TABLE 2

Starting Material Composition and Evaluation Results for the Gloves in the Comparative Examples

| Units: mass % (converted to solids component) | | Comparative Example 1 | Comparative Example 2 | Comparative Example 3 |
|---|---|---|---|---|
| Type of magnetic particles | | $FeFe_2O_4$ | $FeFe_2O_4$ | $FeFe_2O_4$ |
| Latex | NBR latex | 91.2 | 71.3 | — |
| | Sulphur | 1.3 | 1.3 | — |
| | SDBS | 0.1 | 0.1 | — |
| | Vulcanizing accelerator | 0.4 | 0.4 | — |
| | ZnO | 1.2 | 1.2 | — |
| Magnetic Particle Dispersion | $TiO_2$ | 3.1 | 3.1 | — |
| | Pigment | 0.4 | 0.4 | — |
| | Magnetic particles | 0.1 | 20.0 | (20) |
| | SDBS | 0.4 | 0.4 | — |
| Paraffin wax | | 1.8 | 1.8 | — |
| Total (mass %) | | 100.0 | 100.0 | — |
| Thickness of glove film (mm) | | 0.08 | | 0.03 |
| Average particle diameter (μm) of primary particles in glove | | 0.21 | 0.23 | 0.35 |
| Proportion (volume %) of secondary particles of particle diameter over 1 μm in glove | | 18 | 70 | none |
| Evaluation | Minimum detectable volume (mm³) by means of a metal detector | non-detectable | Poor ferrite dispersion/color unevenness | 0.9 |
| | Saturation magnetic flux density (Gauss) | <0.1 | — | 237 |
| | Tensile strength (MPa) | 24.6 | — | — |
| | Elongation (%) | 525 | — | — |
| | 100% modulus (MPa) | 3.5 | — | — |

TABLE 3

Starting Material Composition and Evaluation Results for the Gloves in the Examples

| Units: mass % (converted to solids component) | | Example 6 | Example 7 | Example 8 |
|---|---|---|---|---|
| Type of magnetic particles | | $\gamma\text{-}Fe_2O_3$ | $(MnZn)Fe_2O_4$ | $(NiZn)Fe_2O_4$ |
| Latex | NBR latex | 86.5 | 86.5 | 86.5 |
| | Sulphur | 1.3 | 1.3 | 1.3 |
| | SDBS | 0.1 | 0.1 | 0.1 |
| | Vulcanizing accelerator | 0.4 | 0.4 | 0.4 |
| | ZnO | 1.2 | 1.2 | 1.2 |
| Magnetic Particle Dispersion | $TiO_2$ | 3.1 | 3.1 | 3.1 |
| | Pigment | 0.4 | 0.4 | 0.4 |
| | Magnetic particles | 4.8 | 4.8 | 4.8 |
| | SDBS | 0.4 | 0.4 | 0.4 |

TABLE 3-continued

Starting Material Composition and Evaluation Results for the Gloves in the Examples

| Units: mass % (converted to solids component) Type of magnetic particles | Example 6 γ-Fe$_2$O$_3$ | Example 7 (MnZn)Fe$_2$O$_4$ | Example 8 (NiZn)Fe$_2$O$_4$ |
|---|---|---|---|
| Paraffin wax | 1.8 | 1.8 | 1.8 |
| Total (mass %) | 100.0 | 100.0 | 100.0 |
| Thickness of glove film (mm) | 0.088 | 0.089 | 0.088 |
| Average particle diameter (μm) of primary particles in glove | 0.21 | 0.29 | 0.28 |
| Proportion (volume %) of secondary particles of particle diameter over 1 μm in glove | 50 | 50 | 50 |
| Evaluation Minimum detectable volume (mm$^3$) by means of a metal detector | 3.1 | 3.4 | 4.4 |
| Saturation magnetic flux density (Gauss) | 45 | 40 | 30 |
| Tensile strength (MPa) | 33 | 32 | 31 |
| Elongation (%) | 445 | 450 | 440 |
| 100% modulus (MPa) | 4.8 | 4.9 | 4.9 |

TABLE 4

Starting Material Composition and Evaluation Results for the Gloves in the Examples

| Units: mass % (converted to solids component) Type of magnetic particles | | Example 9 FeFe$_2$O$_4$ | | Example 10 FeFe$_2$O$_4$ | |
|---|---|---|---|---|---|
| Latex tank | | First | Second | First | Second |
| Latex | NBR latex | 92.9 | 75.0 | 92.9 | 57.8 |
| | Sulphur | 1.3 | 1.0 | 1.3 | 0.8 |
| | SDBS | 0.3 | 0.1 | 0.3 | 0.1 |
| | Vulcanizing accelerator | 0.6 | 0.6 | 0.6 | 0.3 |
| | ZnO | 1.2 | 0.9 | 1.2 | 0.7 |
| Magnetic Particle Dispersion | TiO$_2$ | 1.4 | 1.1 | 1.4 | 0.9 |
| | Pigment | 0.2 | 0 | 0.2 | 0 |
| | Magnetic particles | 0 | 19.5 | 0 | 38.0 |
| | SDBS | 0.3 | 0.4 | 0.3 | 0.2 |
| | Paraffin wax | 1.8 | 1.4 | 1.8 | 1.3 |
| Total (mass %) | | 100.0 | 100.0 | 100.0 | 100.0 |
| Thickness of glove film (mm) | | 0.044 | 0.040 | 0.044 | 0.040 |
| Average particle diameter (μm) of primary particles in glove | | — | 0.23 | — | 0.23 |
| Proportion (volume %) of secondary particles of particle diameter over 1 μm in glove | | — | 75 | — | 80 |
| Magnetic particle content in glove as a whole (mass %) | | 9.8 | | 19.8 | |
| Evaluation Minimum detectable volume (mm$^3$) by means of a metal detector | | 0.9 | | 0.5 | |
| Saturation magnetic flux density (Gauss) | | 101 | | 200 | |
| Tensile strength (MPa) | | 25 | | 26 | |
| Elongation (%) | | 460 | | 485 | |
| 100% modulus (MPa) | | 3.5 | | 3.7 | |

TABLE 5

Starting Material Composition and Evaluation Results for the Gloves in the Examples

| Units: mass % (converted to solids component) | | Example 11 | | Example 12 | | |
|---|---|---|---|---|---|---|
| Type of magnetic particles | | FeFe$_2$O$_4$ | | FeFe$_2$O$_4$ | | |
| Latex tank | | First | Second | First | Second | Third |
| Latex | NBR latex | 92.9 | 27.8 | 92.9 | 27.8 | 92.9 |
| | Sulphur | 1.3 | 0.4 | 1.3 | 0.4 | 1.3 |
| | SDBS | 0.3 | 0.1 | 0.3 | 0.1 | 0.3 |
| | Vulcanizing accelerator | 0.6 | 0.2 | 0.6 | 0.2 | 0.6 |
| | ZnO | 1.2 | 0.3 | 1.2 | 0.3 | 1.2 |
| Magnetic Particle Dispersion | TiO$_2$ | 1.4 | 0.4 | 1.4 | 0.4 | 1.4 |
| | Pigment | 0.2 | 0.0 | 0.2 | 0.0 | 0.2 |
| | Magnetic particles | 0.0 | 70.0 | 0.0 | 70.0 | 0.0 |
| | SDBS | 0.3 | 0.2 | 0.3 | 0.2 | 0.3 |
| | Paraffin wax | 1.8 | 0.6 | 1.8 | 0.6 | 1.8 |
| Total (mass %) | | 100.0 | 100.0 | 100.0 | 100.0 | 100.0 |
| Thickness of glove film (mm) | | 0.044 | 0.040 | 0.045 | 0.045 | 0.019 |
| Average particle diameter (μm) of primary particles in glove | | — | 0.23 | | 0.23 | |
| Proportion (volume %) of secondary particles of particle diameter over 1 μm in glove | | — | 78 | | 80 | |
| Magnetic particle content in glove as a whole (mass %) | | 37.1 | | 39.4 | | |
| Evaluation Minimum detectable volume (mm$^3$) by means of a metal detector | | 0.4 | | 0.3 | | |
| Saturation magnetic flux density (Gauss) | | 450 | | 480 | | |

TABLE 5-continued

Starting Material Composition and Evaluation Results for the Gloves in the Examples

| Units: mass % (converted to solids component) | Example 11 | Example 12 |
|---|---|---|
| Tensile strength (MPa) | 23 | 22 |
| Elongation (%) | 460 | 470 |
| 100% modulus (MPa) | 3.5 | 3.9 |

TABLE 6

Starting Material Composition and Evaluation Results for the Glove in the Example

| Units: mass % (converted to solids component) | | Example 13 | | | | |
|---|---|---|---|---|---|---|
| Type of magnetic particles | | FeFe$_2$O$_4$ | | | | |
| | Latex tank | First | Second | Third | Fourth | Fifth |
| Latex | NBR latex | 92.9 | 57.8 | 27.8 | 57.8 | 92.9 |
| | Sulphur | 1.3 | 0.8 | 0.4 | 0.8 | 1.3 |
| | SDBS | 0.3 | 0.1 | 0.1 | 0.1 | 0.3 |
| | Vulcanizing accelerator | 0.6 | 0.3 | 0.2 | 0.3 | 0.6 |
| | ZnO | 1.2 | 0.7 | 0.3 | 0.7 | 1.2 |
| Magnetic | TiO$_2$ | 1.4 | 0.9 | 0.4 | 0.9 | 1.4 |
| Particle | Pigment | 0.2 | 0.0 | 0.0 | 0.0 | 0.2 |
| Dispersion | Magnetic particles | 0.0 | 38.0 | 70.0 | 38.0 | 0.0 |
| | SDBS | 0.3 | 0.2 | 0.2 | 0.2 | 0.3 |
| | Paraffin wax | 1.8 | 1.2 | 0.6 | 1.2 | 1.8 |
| | Total (mass %) | 100.0 | 100.0 | 100.0 | 100.0 | 100.0 |
| | Thickness of glove film (mm) | 0.010 | 0.015 | 0.020 | 0.017 | 0.015 |
| Average particle diameter (μm) of primary particles in glove | | — | 0.23 | 0.23 | 0.23 | |
| Proportion (volume %) of secondary particles of particle diameter over 1 μm in glove | | | 75 | 80 | 75 | |
| Magnetic particle content in glove as a whole (mass %) | | | | 34.0 | | |
| Evaluation | Minimum detectable volume (mm$^3$) by means of a metal detector | | | 0.4 | | |
| | Saturation magnetic flux density (Gauss) | | | 420 | | |
| | Tensile strength (MPa) | | | 24 | | |
| | Elongation (%) | | | 490 | | |
| | 100% modulus (MPa) | | | 3.3 | | |

TABLE 7

Starting Material Composition and Evaluation Results for the Gloves in the Comparative Examples

| Units: mass % (converted to solids component) | | Comparative Example 4 | | Comparative Example 5 | | |
|---|---|---|---|---|---|---|
| Type of magnetic particles | | FeFe$_2$O$_4$ | | FeFe$_2$O$_4$ | | |
| | Latex tank | First | Second | First | Second | Third |
| Latex | NBR latex | 92.9 | 18.5 | 92.9 | 18.5 | 92.9 |
| | Sulphur | 1.3 | 0.3 | 1.3 | 0.3 | 1.3 |
| | SDBS | 0.3 | 0.1 | 0.3 | 0.1 | 0.3 |
| | Vulcanizing accelerator | 0.6 | 0.2 | 0.6 | 0.2 | 0.6 |
| | ZnO | 1.2 | 0.2 | 1.2 | 0.2 | 1.2 |
| Magnetic | TiO$_2$ | 1.4 | 0.3 | 1.4 | 0.3 | 1.4 |
| Particle | Pigment | 0.2 | 0.0 | 0.2 | 0.0 | 0.2 |
| Dispersion | Magnetic particles | 0.0 | 80.0 | 0.0 | 80.0 | 0.0 |

TABLE 7-continued

Starting Material Composition and Evaluation Results for the Gloves in the Comparative Examples

| Units: mass % (converted to solids component) | | Comparative Example 4 | | Comparative Example 5 | | |
|---|---|---|---|---|---|---|
| SDBS | | 0.3 | 0.1 | 0.3 | 0.1 | 0.3 |
| Paraffin wax | | 1.8 | 0.3 | 1.8 | 0.3 | 1.8 |
| Total (mass %) | | 100.0 | 100.0 | 100.0 | 100.0 | 100.0 |
| Thickness of glove film (mm) | | 0.038 | 0.044 | 0.022 | 0.043 | 0.020 |
| Average particle diameter (μm) of primary particles in glove | | — | 0.23 | | 0.23 | |
| Proportion (volume %) of secondary particles of particle diameter over 1 μm in glove | | — | 82 | | 80 | |
| Magnetic particle content in glove as a whole (mass %) | | 42.9 | | | 40.5 | |
| Evaluation | Minimum detectable volume (mm³) by means of a metal detector | 0.3 | | | 0.3 | |
| | Saturation magnetic flux density (Gauss) | 510 | | | 490 | |
| | Tensile strength (MPa) | 14.2 | | | 14.9 | |
| | Elongation (%) | 350 | | | 370 | |
| | 100% modulus (MPa) | 3.5 | | | 3.7 | |

(Evaluation)

Evaluation of the gloves obtained was carried out as follows. The evaluation results are included in the respective tables.

[Saturation Magnetic Flux Density]

The glove saturation magnetic flux density was measured under the following conditions using a vibrating sample magnetometer, model "VSM-5-15" produced by the Toei Industry Co., Ltd.

Magnetization calibration: Ni (nickel), $Gd_2O_3$ (gadolinium oxide)

Measurement field: 10 kOe

Measurement temperature: room temperature

[Minimum Detectable Volume]

Measurements were carried out using a model "MS-3137" metal detector made by Nissin Electronics Co., Ltd. The predetermined detection sensitivity of this metal detector was an Fe ball of diameter 0.5 mm.

Various sizes of glove piece were cut out, then whether or not each such glove piece could be detected with the metal detector was checked, and the smallest size of glove piece which could be detected by means of the metal detector was taken as the minimum detectable volume.

[Tensile Strength, Tensile Breaking Elongation, 100% Modulus]

As measures of the mechanical strength of the glove, the tensile strength (MPa), the elongation at break (%) and the 100% modulus (MPa) were measured in accordance with JIS K 6251-1993. Measurements were performed with a No. 5 dumbbell at an extension rate of 500 mm/min, using a model "STA-1225" tensile testing machine manufactured by Orientec Co., Ltd.

[Observations of the Magnetic Particles within the Glove]

In the case of Example 5, Comparative Example 3 and Example 9, the cross-section of the cut glove was observed in each case using a scanning electron microscope (SEM). The SEM micrographs for said Example 5, Comparative Example 3 and Example 9 are shown in FIGS. 1 to 3 respectively. In each figure, the particle-shaped white regions are the magnetic particles.

It can be seen from the tables above that, in the case of the gloves in the examples, the minimum detectable volume using the metal detector was no more than 36 mm³, with the saturation magnetic flux density being at least 4 gauss, so smaller glove pieces were detectable by means of the metal detector. Furthermore, the gloves were superior also in terms of their mechanical properties and it was possible to produce thin gloves of thickness 0.091 mm or less.

As shown in Examples 1-5, the minimum detectable volume using the metal detector was lowered to 0.7 mm³ along with an increase in the magnetic particles.

In Comparative Example 1, the amount of magnetic particles incorporated was insufficient, so the saturation magnetic flux density was below 0.1 gauss and it was not possible to detect glove pieces by means of the metal detector.

In Comparative Example 2, the amount of the magnetic particles incorporated was excessive, so it was difficult to mix the latex and magnetic particle dispersion uniformly, and colour unevenness arose in the glove obtained.

In Comparative Example 3, the minimum detectable volume by means of a metal detector was low, but a considerable amount of magnetic particles was incorporated and so, it is thought the elongation is reduced. In Comparative Example 3, the minimum detectable volume was 0.9 mm³ for a magnetic particle content of 20 mass %. In contrast to this, in Example 5 the minimum detectable volume was 0.7 mm³ for a magnetic particle content of 15.0 mass %. Thus, in Example 5, it was possible to reduce the minimum detectable volume while having a lower magnetic particle content.

As can be seen from FIG. 1, the magnetic particles in Example 5 were aggregated secondary particles whereas, from FIG. 2, it is apparent that in the case of Comparative Example 3 there was no marked aggregation of the magnetic particles as secondary particles, and instead there was a uniform dispersion of primary particles. Specifically, it could be seen that the secondary particles in Comparative Example 3 did not exceed 1 μm. It is thought that it was possible to reduce the minimum detectable volume in Examples 1 to 5 due to this difference in aggregated state.

In Examples 6 to 8, the types of magnetic particles were different, but in each case there was the same excellent result as in Example 3 where the amount of magnetic particles incorporated was the same.

Moreover, in Examples 9-13, when performing the dipping of the glove former in the latex, said glove former was dipped a number of times in latexes of different compositions. In the case of Example 9, the cross-sectional structure of the glove was a two-layer structure as shown in FIG. 3, but the magnetic particle content of the glove film as a whole was about the same as in Example 4. As a result, in terms of the minimum volume detectable by means of the metal detector, there were about the same sensitivity and good results as in Examples 4 and 5. Additionally, in the case of Examples 10-13, in spite of the concentration of the magnetic particles in those latexes containing magnetic particles being high at 30 mass % or more, no colour unevenness was noted at the surface of the gloves, and good results were obtained for the various physical properties.

The invention claimed is:

1. A glove containing magnetic particles in a glove film formed from rubber or resin, wherein the magnetic particles are at least 0.2 mass % but less than 40 mass % in terms of the glove film as a whole, the magnetic particles include secondary particles of aggregated primary particles, the average particle diameter of the primary particles is no more than 1 μm, and the proportion by volume of particles where the particle diameter of the secondary particles exceeds 1 μm is at least 20 vol % in terms of the combined volume of particles as a whole.

2. The glove as claimed in claim 1, wherein the glove film is a single layer, and the concentration of the magnetic particles is at least 0.2 mass % but less than 20 mass % in terms of the glove film as a whole.

3. The glove as claimed in claim 1, wherein the glove film is a plurality of layers, and contains magnetic particles which include secondary particles of aggregated primary particles in part or in all of the rubber or resin layers, and the concentration of the magnetic particles is at least 0.4 mass % but less than 40 mass % in terms of the glove film as a whole.

4. The glove as claimed in any one of claims 1 to 3, wherein the magnetic particles include ferrite particles.

5. The glove as claimed in claim 1, wherein the ferrite particles are magnetite particles.

6. The glove as claimed in any one of claims 1 to 5, wherein the rubber is of at least one type selected from natural rubber, nitrile butadiene rubber (NBR), carboxylated NBR (X-NBR), isoprene rubber, chloroprene rubber, butyl rubber and butadiene rubber.

7. A method for manufacturing a glove by an immersion method, comprising:
   a process wherein magnetic particles where the average particle diameter of primary particles is no more than 1 μm are dispersed in a solvent to prepare a magnetic particle dispersion;
   a process wherein the magnetic particle dispersion is added to an emulsion containing rubber or resin, to prepare an emulsion containing magnetic particles in which the magnetic particles are at least 0.2 mass % in terms of the total solids component; and
   a process wherein, by using the emulsion containing magnetic particles, there is produced a glove containing secondary particles of aggregated primary particles in which the magnetic particles are at least 0.2 mass % but less than 40 mass % in terms of a glove film as a whole, and the proportion by volume of particles where the particle diameter of the secondary particles exceeds 1 μm is at least 20 vol % in terms of the combined volume of particles as a whole.

8. The method for manufacturing a glove by an immersion method as claimed in claim 7, wherein there is less than 20 mass % of magnetic particles in the emulsion containing magnetic particles, and the rubber or resin layer is a single layer.

9. The method for manufacturing a glove by an immersion method as claimed in claim 7, wherein there is less than 80 mass % of magnetic particles in the emulsion containing magnetic particles, and magnetic particles are included in part or all of a plurality of rubber or resin layers.

* * * * *